United States Patent [19]

Minagawa et al.

[11] 4,282,141
[45] Aug. 4, 1981

[54] ORTHO-SUBSTITUTED PHENYL PHOSPHITE ADDITIVE COMPOSITION

[75] Inventors: Motonobu Minagawa, Koshigaya; Yutaka Nakahara, Iwatsuki; Kazumi Kitsukawa, Misato, all of Japan

[73] Assignee: Argus Chemical Corporation, Brooklyn, N.Y.

[21] Appl. No.: 57,456

[22] Filed: Jul. 13, 1979

[30] Foreign Application Priority Data

Jul. 13, 1978 [JP] Japan .................... 53/85902

[51] Int. Cl.³ ........................... C08K 5/07; C08K 5/52
[52] U.S. Cl. ........................... 260/45.7 R; 252/400 A; 252/400 R; 252/407; 260/23 XA; 260/45.7 PH; 260/45.75 W; 260/45.85 R; 260/45.95 J; 260/45.95 P; 260/45.95 S
[58] Field of Search .................. 260/45.7 PH, 45.7 R, 260/45.8 A, 45.75 W, 45.95 J; 252/400 A

[56] References Cited

U.S. PATENT DOCUMENTS

| | | | |
|---|---|---|---|
| 2,307,075 | 1/1943 | Quattlebaum, Jr. et al. | 260/45.75 R |
| 2,564,646 | 8/1951 | Leistner et al. | 260/45.7 PH |
| 3,039,993 | 6/1962 | Friedman | 260/45.7 PH |
| 3,231,531 | 1/1966 | Buckley et al. | 260/45.7 PH |
| 3,245,926 | 4/1966 | Parker | 260/45.7 PH |
| 3,262,896 | 7/1966 | Ackerman | 260/45.7 PH |
| 3,415,906 | 12/1968 | Shepard et al. | 260/937 |
| 3,492,267 | 1/1970 | Wood | 260/45.75 W |
| 3,558,554 | 1/1971 | Kuriyama et al. | 260/45.7 PH |
| 3,697,463 | 10/1972 | Oakes et al. | 260/45.7 PH |
| 3,697,463 | 10/1972 | Oakes et al. | 260/45.7 PH |
| 3,787,537 | 1/1974 | De Marcq | 260/45.7 PH |
| 3,933,733 | 1/1976 | Kimura et al. | 260/45.7 PH |
| 4,116,907 | 9/1978 | Shiohara et al. | 260/45.7 R |
| 4,187,212 | 2/1980 | Zinke et al. | 260/45.7 PH |
| 4,221,687 | 9/1980 | Minagawa et al. | 260/45.75 W |

Primary Examiner—Howard E. Schain
Assistant Examiner—R. A. White
Attorney, Agent, or Firm—Otto S. Kauder

[57] ABSTRACT

An additive composition for improving the color stability of a vinyl chloride polymer stabilized with environmentally acceptable stabilizers comprises a 1,3-diketone or 1,3-diketone Na, K., Li, Mg, Zn, Ba, Ca, Sn, or Sr salt and an organic phosphite having the formula

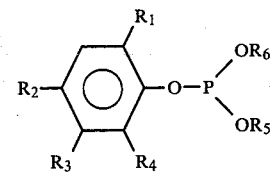

wherein $R_1$ is a phenyl, cycloalkyl, t-butyl, or t-amyl group, $R_2$ and $R_3$ are each a hydrogen atom or phenyl, cycloalkyl, or an alkyl group having one to five carbon atoms, $R_4$ is a hydrogen atom or a methyl group, and each of $R_5$ and $R_6$ independently is a hydrogen atom, an alkyl group having 1 to 18 carbon atoms, a cycloalkyl group having 5 to 20 carbon atoms, an aryl group having 6 to 12 carbon atoms, or an ether-substituted group having 3 to 80 carbon atoms and 1 to about 40 ether oxygen atoms.

18 Claims, No Drawings

ORTHO-SUBSTITUTED PHENYL PHOSPHITE ADDITIVE COMPOSITION

BACKGROUND OF THE INVENTION

This invention relates to environmentally acceptable stabilized vinyl chloride polymer compositions from which environmentally objectionable metals such as arsenic, cadmium, beryllium, lead, mercury, and thallium are substantially excluded, and to an anti-yellowing additive so such environmentally acceptable stabilized vinyl chloride polymer compositions to minimize undesirable yellowing during the process of fabricating and shaping such compositions into useful articles.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin carboxylates. as disclosed by Quattlebaum in U.S. Pat. No. 2,307,157; organotin mercaptides as disclosed by Leistner in U.S. Pat. Nos. 2,641,588 and 2,641,598; various metal-free organic compounds such as the polyols, e.g. mannitol, sorbitol, glycerol, pentaerythritol, organic phosphites, 1,2-epoxides, e.g., soybean oil epoxide, isooctyl epoxy-stearate, and diglycidyl ether of 2,2-bis(p-hydroxyphenyl) propane, and nitrogen compounds, e.g., phenylurea, N,N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12, pages 737 to 768 (1970); N. L. Perry "Barium-Cadmium Stabilization of Polyvinyl Chloride," *Rubber Age* 85 449–452 (June, 1959), and by H. Verity-Smith, *British Plastics* 27 176–179, 213–217, 307–311 (1954); the brochure by the same author *The Development of the Organotin Stabilizer* (Tin Research Institute, 1959) and the book *La Stabilisation des Chlorures de Polyvinyle* by F. Chevassus (Amphora, Paris, 1957).

Preponderant in quantity used for many years have been the lead salts, such as tribasic lead sulfate, normal and dibasic lead stearate, dibasic lead phthalate, dibasic leadphosphite, and basic lead carbonates and silicates. Vinyl chloride polymer compositions stabilized with lead compounds are recognized as outstanding in electrical properties and good in color protection during long extended processing at high temperatures, while poor in clarity owing to the insolubility and pigmenting properties of the lead compounds. Next in quantity used have been the organic salt mixtures containing cadmium, as disclosed for example by W. Leistner, in U.S. Pat. No. 2,716,092 of Aug. 23, 1955, G. Mack in U.S. Pat. No. 2,935,491, of May 23, 1960 and J. Scullin in U.S. Pat. No. 3,390,112 of June 25, 1968. Cadmium containing stabilizers have provided excellent heat stability combined with outstanding clarity and resistance to weathering exposure. With the steady increase in usage of vinyl chloride polymer compositions and coincidentally increased concern about the accumulation of toxic materials in the human environment, there has developed a need to replace the lead and cadmium based stabilizers by environmentally more acceptable and no less effective stabilizers. The very favorable properties of the lead and cadmium containing stabilizers, however, have made it difficult to find equivalent replacements. In particular, vinyl chloride polymer compositions stabilized with materials other than lead and cadmium have been subject to objectionable yellowing even where the time to severe heat failure was relatively satisfactory.

Many organic phosphites have been proposed as stabilizers for polyvinyl chloride resins, and are employed either alone or in conjunction with other stabilizing compounds, such as polyvalent metal salts of fatty acids and alkyl phenols. Such phosphite stabilizers normally contain alkyl or aryl radicals in sufficient numbers to satisfy the three valences of the phosphite. Typical phosphites are described, for example, by W. Leistner et al in U.S. Pat. Nos. 2,564,646 of Aug. 14, 1951 and 2,997,454 of Aug. 2, 1961, and by L. Friedman et al in U.S. Pat. Nos. 3,047,608 of July 31 and 3,053,878 of Sept. 11, 1962.

J. Darby in U.S. Pat. No. 2,669,548 of Feb. 16, 1954 disclosed halogen-containing resin compositions having improved stability containing a mixture of a zinc salt and a calcium chelate derivative of a 1,3-dicarbonylic compound capable of keto-enol tautomerism. Zinc salts can be zinc salts of organic acids and zinc salts of weak inorganic acids, for example zinc acetate, zinc propionate, zinc octanoate, zinc ricinoleate stearate, and zinc salts of carbonic, silicic, and boric acids. Calcium chelates can be derivatives of betadiketones, beta-ketoacids, and the esters of betaketoacids, for example the calcium chelates of ethyl acetoacetate, phenyl acetoacetate, acetoacetic acid, acetylaceton, benzoylaceton, and diacetylaceton.

F. Ebel in U.S. Pat. No. 3,001,970 of Sept. 26, 1961 disclosed preventing the discoloration of polymers of vinylidene chloride in light by adding a small amount of a dibenzoylmethane of the general formula:

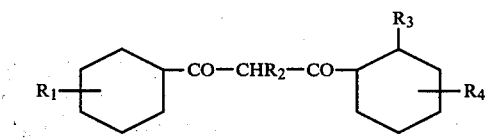

in which $R_1$ represents hydrogen or a hydroxyl radical, and $R_3$, $R_3$ and $R_4$ represent hydrogen or hydrophobic radicals. Such hydrophobic radicals are for example alkyl, cycloalkyl, aryl, aralkyl and halogen radicals.

L. L. Wood in U.S. Pat. No. 3,492,267 of Jan. 27, 1970 disclosed zinc complexes of beta-dicarbonyl compounds used as stabilizing additives for chlorine-containing polymers in general, and polyvinyl chloride in particular. The Zinc complexes possess the general formula:

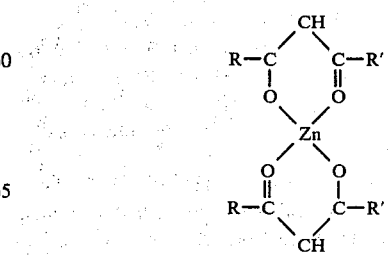

wherein R and R' are the same or different and are each hydrogen or an alkyl, alkoxy, phenyl or phenoxy group. Preferably when R represents an alkyl or alkoxy group, it contains 1 to 20 carbon atoms.

L. Weisfeld in U.S. Pat. No. 3,493,536 of Feb. 3, 1970 disclosed that diaroylmethane compounds of the general formula $C_6H_5CO-CHR-COC_6H_5$ wherein R is hydrogen or a monovalent hydrocarbon radical provide stabilizing action against the sensitizing effect of bismuth or antimony compounds on chlorine-containing materials. M. Crochemore in U.S. Pat. No. 4,102,839 of July 25, 1978 disclosed the possibility of preventing the thermal breakdown of vinyl chloride polymers by adding 0.1 to 5% by weight of the polymer of one or more carboxylic acid salts of 2-valent metals such as calcium, barium, zinc, lead, or cadmium and 0.05 to 5% by weight of an organic compound having the formula: $R_1-CO-CHR_2-CO-R_3$ in which $R_1$ and $R_3$, which can be alike or different, represent linear or branched alkyl or alkenyl groups with up to 30 carbon atoms, arylkyl groups with 7 to 36 carbon atoms, or aryl or cycloaliphatic groups with less than 14 carbon atoms, optionally substituted with halogen atoms, aryl or cycloaliphatic groups, methyl or ethyl groups; aliphatic $R_1$ and $R_3$ groups can also be modified by the presence of one or more

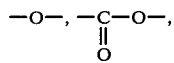

or —CO— groups, or taken together represent a 2-valent alkylene group having two to five carbon atoms; also, one of the groups $R_1$ and $R_3$ can be a hydrogen atom; $R_2$ is a hydrogen atom, an alkyl or alkenyl group with up to 30 carbon atoms which can include

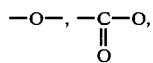

and —CO— groups, a group $R-CO-R_4$ where $R_4$ is an alkyl group with 1 to 30 carbon atoms or an aryl group when $R_1$ and $R_3$ are non-aromatic, or a group having the formula $-R_5-CH(-CO-R_1)-CO-R_3$ in which $R_5$ is an alkylene group with 1 to 6 carbon atoms. The combination of carboxylic acid metal salt and 1,3-dicarbonyl compound is stated to be superior to an equimolar quantity of 1,3-dicarbonyl compound metal chelate.

M. Gay in U.S. Pat. Nos. 4,123,399 and 4,123,400 of Oct. 31, 1978 has disclosed vinyl chloride compositions containing relative to the weight of the polymer from 0.1 to 5% of one of the four pairs of organic salts of the metals Ca-Zn, Ca-Cd, Ba-Zn, or Ba-Cd, the organic salts being salts of saturated or unsaturated, substituted or unsubstituted aliphatic carboxylic acids, or aromatic carboxylic acids, together with 0.05 to 1% by weight of a polyol, and 0.05 to 5 parts of an organic compound having the formula $R_1-CO-CH-R_2-CO-R_3$ in which $R_1$, $R_2$, and $R_3$ are defined as by Crochemore, above.

F. Goto in Japanese patent publication No. 47948/77 of Dec. 6, 1977 disclosed stabilized halogen containing resin compositions containing 0.001 to 3 parts of a diketone stabilizer having the formula:

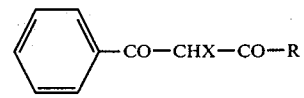

in which X is a hydrogen or a methyl or ethyl group, and R is alkyl or aryl.

Certain vinyl chloride polymer compositions disclosed by Wood, Crochemore, Gay, or Goto contain as an additional ingredient a simple triaryl phosphite such as triphenylphosphite or tri(nonylphenyl) phosphite.

In U.S. Pat. No. 3,346,536 of Oct. 10, 1967 there is disclosed a stabilizer combination of a ketoacetic acid compound, which can be an ester or an acid anhydride dimer thereof, with a metal salt of an organic acid. The ketoacetic acid esters have the formula:

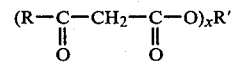

wherein R is an inert organic group having from one to about thirty carbon atoms, R' is an inert organic radical having from one to about thirty carbon atoms, and x is a number from one to ten. The ester molecule has a total of at least eight carbon atoms.

The ketoacetic acid anhydride dimers have the formula

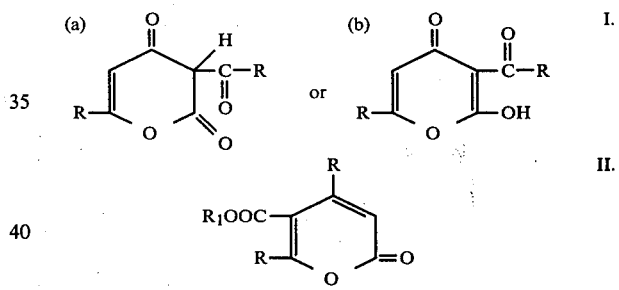

R is again as above and $R_1$ is hydrogen or R'.

It is further disclosed that this stabilizer combination can be used with additional heat stabilizers, among which phenols and organic triphosphites and acid phosphites are preferred. Many useful phosphites are disclosed at Column 9 line 16 to Column 10 line 13.

SUMMARY OF INVENTION

In accordance with this invention, environmentally acceptable stabilized vinyl chloride polymer compositions are prepared from which environmentally objectionable metals such as arsenic, beryllium, cadmium, lead, mercury, and thallium are excluded. The exclusion of the objectionable metals is accomplished by avoiding the use of previously irreplaceable cadmium and lead based stabilizers and holding the level of unavoidable incidental contamination by objectionable metals to the lowest practicable amount, usually governed by the natural impurity levels found in metal compound starting materials used in the preparation of vinyl chloride polymer stabilizers based only on environmentally acceptable metals such as zinc, tin, calcium, barium, lithium, sodium, potassium, aluminum, strontium, zirconium and magnesium. Thus the use of a typical lead based stabilizer formulation in polyvinyl chloride plastic results in a lead content of 25,000 to 50,000 mg lead per kilogram of plastic while the use of typical cadmium containing stabilizer formulation contributes 200 to 2000 mg cadmium per kilogram of plastic. The use, on the other hand, of stabilizers made from available commercial grades of the environmentally acceptable metals without addition of compounds of the listed objectionable metals contributes per kilogram of plastic 10 mg or less of arsenic, beryllium, cadmium, lead, mercury, and thallium combined. Accordingly, environmentally acceptable stabilized vinyl chloride polymer compositions are defined as stabilized vinyl chloride polymers compositions containing not more than 10 mg of arsenic, beryllium, cadmium, lead, mercury, and thallium combined per kilogram of vinyl chloride polymer.

Also in accordance with this invention, an anti-yellowing additive is added to prevent objectionable yellowing of environmentally acceptable stabilized vinyl chloride polymer compositions as above defined. The quantity of anti-yellowing additive needed is modest, ranging from 0.02 part by weight to 15 parts by weight per 100 parts by weight of vinyl chloride polymer. The anti-yellowing additive comprises in combination (A) at least one 1,3-diketone compound, which is a sodium, potassium, lithium, magnesium, zinc, barium, calcium, tin, or strontium salt of a 1,3-diketone or a metal-free 1,3-diketone; and (B) at least one ortho-substituted phenyl phosphite having the formula

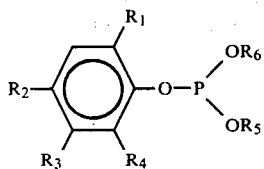

in which
$R_1$ is a phenyl group, a cycloalkyl group having 5 to 8 carbons, a t-butyl or t-amyl group;
each of $R_2$ and $R_3$ each independently is a hydrogen atom, a phenyl group, an alkyl group having 1 to 5 carbon atoms, or a cycloakyl group having 5 to 8 carbon atoms; $R_4$ is a hydrogen atom or a methyl group, and each of $R_5$ and $R_6$ independently is a hydrogen atom, an alkyl group having 1 to 18 carbon atoms, a cycloalkyl group having 5 to 20 carbon atoms, an aryl group having 6 to 12 carbon atoms, an aralkyl group having 7 to 12 carbon atoms, an alkaryl group having 7 to 18 carbon atoms, or an ether-substituted group having 3 to about 80 carbon atoms and 1 to about 40 ether oxygen atoms.

The relative weight proportions of 1,3-diketone compounds (A) and phosphite (B) to each other in the additive are preferably in the range from 2 to 20 parts of the latter for each part of the former.

DESCRIPTION OF PREFERRED EMBODIMENTS

The 1,3-diketone compound component (A) of the anti-yellowing additive of this invention can be any of the known 1,3-diketone compounds represented by the formula

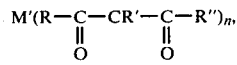

in which R is a hydrocarbon group, a halohydrocarbon group, an alkoxyhydrocarbon group, or an alkylenedioxyhydrocarbon group having 1 to 18 carbon atoms; R' is a hydrogen atom, an acyl group

where R''' is alkyl, or a hydrocarbon group having 1 to 18 carbon atoms; R'' is a hydrogen atom or a hydrocarbon group, a halohydrocarbon group, an alkoxyhydrocarbon group, or an alkylenedioxyhydrocarbon group having 1 to 18 carbon atoms; M' is hydrogen or a metal selected from the group consisting of lithium, sodium, potassium, magnesium, calcium, strontium, barium, and zinc; and n is an integer from 1 to 2 depending on the valence of M'.

When in this formula M' is a hydrogen atom, the formula becomes

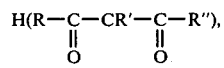

which is a way to indicate by a single expression that the hydrogen atom can be linked in more than one way, as in the tautomeric formulas 1 to 111 (i.e. formulas of compounds in readily movable equilibrium with one another)

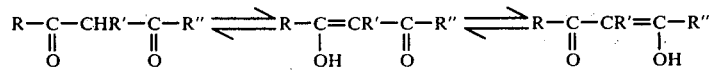

the latter two of which are identical when R and R'' are the same and non-identical when R and R'' are different. The relative proportions of tautomers I, II, and III in the 1,3-diketone compounds is a function of the identity of R and R''; for example the enol content (i.e. combined content of the C=C containing tautomers II and III) has been reported as 76.4% for diacetylmethane (R=R''=methyl) and 89.2% for acetylbenzoylmethane (R=methyl, R''-phenyl) (see A Gero, J. Organic Chem. 1954, vol. 19, p. 1960-1970). When M' is a metal, the formula

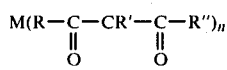

indicates that, while numerous structural formulas can be written differing in the location of various linkages (as illustrated for zinc acetylbenzoylmethane by formulas IV to VII below), all are equivalent representations of a single compound which is better represented as a "hybrid" of all formulas than by any single one. In formulas IV to VII, Ph represents phenyl and Me represents methyl.

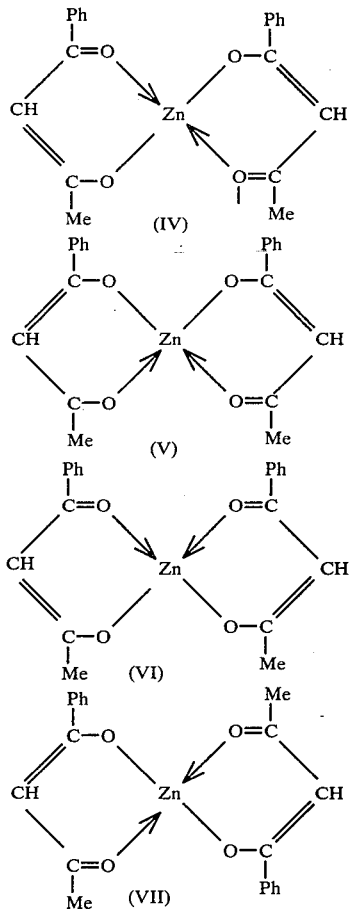

In the formula of 1,3-diketone metal compounds, n is the valence of the metal and the number of 1,3-diketone groups per metal atom, as shown:

| M | Li | Na | K | Mg | Ca | Sr | Ba | Zn |
|---|----|----|---|----|----|----|----|----|
| n | 1  | 1  | 1 | 2  | 2  | 2  | 2  | 2  |

Hydrocarbon groups R, R', R'', and R''' can be open chain or cyclic and include such aliphatic, cycloaliphatic, and aromatic hydrocarbon groups as alkyl and alkenyl groups having 1 to 18 carbon atoms, cycloalkyl, cycloalkenyl and cycloalkylalkylene, and alkylcycloalkyl groups having 5 to 18 carbon atoms, and non-condensed aryl groups (including aralkyl and alkyaryl) having 6 to 18 carbon atoms, for example methyl, ethyl, propyl, isopropyl, isobutyl, n-butyl, s-butyl, t-butyl, 1-pentyl, 3-pentyl, 1-hexyl, 1-heptyl, 3-heptyl, 1-octyl, 2,4,4-trimethylphenyl, t-octyl, nonyl, decyl, tridecyl, pentadecyl, heptadec-8-en-1-yl, n-octadecyl, allyl, methallyl, 2-hexenyl, 1-methylcyclopentyl, cyclohexyl, cyclohexanepropyl, phenyl, m-tolyl, p-ethylphenyl, t-butylphenyl, benzyl, phenylpropyl and nonylbenzyl. Halohydrocarbon R, R', R'', and R''' groups include dichloromethyl, heptafluoropropyl, p-bromophenyl, and 3,4-dichlorobenzyl. Alkoxyhydrocarbon R, R', R'', and R''' groups include ethoxymethyl, n-butoxymethyl, 2-methoxyethyl, 2-methoxyphenyl, and 4-n-octoxyphenylbenzyl. R, R', R'', and R''' alkylenedioxyhydrocarbon groups include 3(ethylenedioxypropyl) and 3,4-methylenedioxyphenyl.

R' as well as either but not both of R and R'' can be hydrogen.

The 1,3-diketone compound can be, for example, benzoyl-p-chlorobenzoylmethane, bis(4-methyl-benzoyl)methane, bis(2-hydroxybenzoyl)methane, benzoylacetylmethane, tribenzoylmethane, diacetylbenzoylmethane, stearoyl-benzoylmethane, palmitoyl-benzoylmethane, lauroylbenzoylmethane, dibenzoyl methane, 4-methoxybenzoyl-benzoylmethane, bis(4-methoxybenzoyl)methane, bis(4-chlorobenzoyl)methane, bis(3,4-methylenedioxybenzoyl)methane, benzoyl-acetyl-octylmethane, benzoyl-acetyl-phenylmethane, stearoyl-4-methoxybenzoylmethane, bis(4-t-butylbenzoyl)methane, benzoyl-acetyl-ethylmethane, benzoyl-trifluoroacetyl-methane, diacetylmethane, butanoyl-acetylmethane, heptanoyl-acetylmethane, triacetylmethane, stearoylacetylmethane, palmitoyl-acetylmethane, lauroyl-acetylmethane, benzoyl-phenylacetylmethane, bis(cyclohexane-carbonyl)methane, and dipivaloylmethane. The Li, Na, K, Mg, Ca, Sr, Ba, and Zn salts of the above betadiketone compounds can also be used. The quantity of 1,3-diketone compound used represents preferably 0.001 to 1 part by weight-per 100 parts by weight of vinyl chloride polymer.

In the formula of the ortho-substituted phenyl phosphite, $R_5$ and $R_6$ can be the same of different. Either or both of $R_5$ and $R_6$ can be a

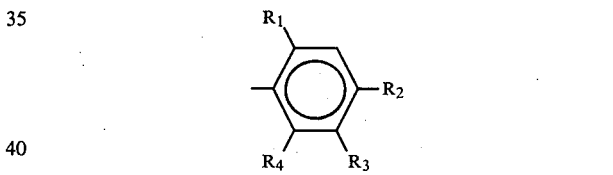

group, in which $R_1$ and $R_2$, $R_3$ and $R_4$ are as defined above. $R_5$ and $R_6$ can also be alkyl such as methyl, ethyl, propyl, iso-propyl, butyl, sec-butyl, t-butyl, amyl, t-amyl, iso-amyl, hexyl, isohexyl, heptyl, octyl, iso-octyl, 2-ethylhexyl, decyl, iso-decyl, lauryl, tridecyl, $C_{12-15}$ mixed alkyl, and stearyl; cycloalkyl such as cyclopentyl, cyclohexyl, cyclooctyl, cyclododecyl and 4-methylcyclohexyl; aryl such as phenyl, biphenyl and naphthyl, aralkyl such as benzyl, beta-phenylethyl, alpha-phenylpropyl and beta-phenylpropyl; alkylaryl such as tolyl, xylyl, ethylphenyl, butylphenyl, t-butylphenyl, octylphenyl, isooctylphenyl, t-octylphenyl, nonyl-phenyl and 2,4-di-t-butylphenyl; and a group containing ether linkages such as furfuryl tetrahydrofurfuryl, 5-methylfurfuryl, and alpha-methylfurfuryl; the residue of a methyl-, ethyl-, iso-propyl-, butyl-isobutyl-, hexyl-, cyclohexyl- or phenyl monoether of ethylene glycol the residue of a methyl-, ethyl-, iso-propyl-, butyl- or isobutyl monoether of diethylene glycol; the residue of triethyleneglycol-monomethyl ether, -monoethyl ether or monobutyl ether; 2,3-dimethoxypropyl, 1,3-di-methoxy-2-propyl, 1,3-diethyoxy-2-propyl, or ethoxy-2-propoxypropyl; nonylphenoxypolyethoxyethyl and lauroxypolyethoxyethyl; and alkoxy aryl such as 4-methoxyphenyl, 4-ethoxyphenyl, 3-lauroxyphenyl, 2-methoxy-4-methylphenyl, 2-t-butyl-4- methoxyphenyl, 4-benzoyloxyphenyl and 3,4-methylene-dioxyphenyl. In addition, $R_5$ can be hydrogen.

Representative ortho-tertiary-alkylphenyl phosphites include for example 2,4-di-t-butylphenyl.di-isodecylphosphite, tris(2,4-di-t-butylphenyl) phosphite, 2,4-di-t-butylphenyl.bis(2-cyclohexylphenyl)phosphite, 2,4-di-t-butylphenyl.dicyclohexyl phosphite, bis(2,4-di-t-butylphenyl). cyclohexylphosphite, tris(2,4-di-t-amylphenyl)phosphite, tris(2-t-butyl-4-methylphenyl) phosphite, tris(2,4-di-t-butyl-5-methylphenyl)phosphite, bis(2-t-butylphenyl).isodecyl phosphite, 2-t-butyl-4-methylphenyl.dibutyl phosphite, 2-t-butyl-4-methylphenyl.dihexyl phosphite, 2-t-butyl-4-methylphenyl.-di(2-ethylhexyl)phosphite, 2-t-butyl-4-methylphenyl.-diphenyl phosphite, tris(2-t-butylphenyl)phosphite, bis(2,4-di-t-butylphenyl).2-ethylhexylphosphite, bis(2,4-di-t-butylphenyl).benzylphosphite, bis(2,4-di-t-butylphenyl).butoxyethyl-ethylphosphite, 2,4-di-t-butyl-6-methylphenyl.bis(2-cyclohexylphenyl)phosphite, bis(2-t-butyl-4-methylphenyl).4-methoxyphenylphosphite, 2,4-di-t-butylphenyl.phenyl.tridecylphosphite, 2,4-di-t-amylphenyl.bis(nonylphenyl)phosphite, bis(2-t-butyl-4-methylphenyl.2-phenylphenylphosphite, 2-t-amyl-4-methylphenyl.bis(4-phenylphenyl)phosphite, 2,4-di-t-butylphenyl.bis(di-nonylphenyl)phosphite, bis(2,4-di-t-butyl-5-methylphenyl).$C_{12-15}$ mixed alkyl phosphite, bis(2-t-butyl-4-methylphenyl)phosphite, bis(2,4-di-t-butylphenyl)phosphite, bis(2-t-butyl-4,6-di-methylphenyl)phosphite, bis(2,4-di-t-butyl-6-methylphenyl)phosphite, bis(2,4-di-t-amylphenyl) phosphite, 2,4-di-t-butylphenyl.phenylphosphite, 2,4-di-t-butylphenyl. 2 or 4-cyclohexylphenylphosphite, 2,4-di-t-butylphenyl.isodecylphosphite, bis(2-t-butylphenyl)phosphite, bis(2-t-amylphenyl)phosphite, 2,4-di-t-butylphenyl.2-cyclohexylphenyl.isodecylphosphite, bis(2,4-di-t-butylphenyl). 2-cyclohexylphenylphosphite.

The additive of this invention supplies 0.01–5 parts by weight, preferably 0.05–3 parts by weight, of the ortho-substituted phenyl phosphite per 100 parts by weight of vinyl chloride polymer.

Vinyl chloride polymer compositions containing the anti-yellowing additive of this invention are satisfactorily stabilized against deterioration during processing and the subsequent use with conventional stabilizers other than lead or cadmium compounds. Such stabilizers are used in concentration of 0.1 to about 10 parts by weight per 100 parts by weight of vinyl chloride polymer and include 1,2-epoxides, and salts of hydrocarbon-substituted phenols and/or non-nitrogenous monocarboxylic acids having 6 to 30 carbon atoms with metals other than lead and cadmium.

The anti-yellowing additive of this invention is useful in any environmentally acceptable stabilized vinyl chloride polymer. The term "vinyl chloride polymer" as used herein is inclusive of any polymer formed at least in part of the recurring group,

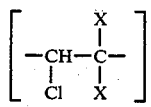

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, ethylene, 1-hexane, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definition of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent molulus of esasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

1,2-Epoxides that can be used to stabilize vinyl chloride polymer compositions containing the anti-yellowing additive of this invention include epoxidized triglyceride oils such as epoxysoybean oil, epoxylinseed oil, epoxidized fish oils and epoxidized tallow; epoxidized esters such as methyl, isobutyl, and 2-ethylhexyl epoxystearates, epoxidized butyl and isooctyl esters of tall oil fatty acids, and 3,4-epoxycyclohexanemethyl 3,4-epoxycyclohexane-carboxylate; epoxidized hydrocarbons such as epoxidized polybutadiene and 1,2,5-tris(epoxyethyl)benzene; and epoxidized ethers such as 1,2,3-tris(2',3'-epoxypropoxy)propane and 4,4'-isopropylidenebis(phenyl glycidyl ether). A comprehensive disclosure of 1,2-epoxide stabilizers by T. Sekiguchi in U.S. Pat. No. 4,105,627 of Aug. 8, 1978, Column 8 line 48 to Column 9 line 40 is here incorporated by reference. The amount of 1,2-epoxide when used can be from 0.01 to 10 parts by weight per 100 parts of vinyl chloride polymer preferably from 0.1 to 5 parts.

Metal salts that can be used to stabilize vinyl chloride polymer compositions containing the anti-yellowing additive of this invention are preferably salts of at least one bivalent non-transition metal, such as barium, calcium, magnesium, strontium, stannous tin and zinc. The amount of metal salt when used is from 0.01 to 10 preferably from 0.1 to 3 parts by weight per 100 parts of vinyl chloride polymer.

In the salt, the acid can be any organic non-nitrogenous mono-carboxylic acid having from six to twenty-four carbon atoms.

The aliphatic, aromatic, alicyclic and oxygen-containing heterocyclic organic acids are operable as a class. By the term "aliphatic acid" is meant any open chain carboxylic acid, substituted, if desired, with non-reactive groups, such as hydrogen, sulfur and hydroxyl. By the term "alicyclic" it will be understood that there is intended any cyclic acid in which the ring is non-aromatic and composed solely of carbon atoms, and such acids may if desired have inert, non-reactive substituents such as halogen, hydroxyl, alkyl radicals, alkenyl radicals and other carbocyclic ring structures condensed therewith. The oxygen-containing heterocyclic compounds can be aromatic or non-aromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith. As exemplary of the acids which can be used in the form of their metal salts there can be mentioned the following: hexoic acid, 2-ethylhexoic acid, n-octoic acid, isooctoic acid, 3,5,5-trimethyl hexoic acid, capric acid, undecyclic acid, lauric acid, myristic acid, palmitic acid, margaric acid, stearic acid, oleic acid, ricinoleic acid, behenic acid, chlorocaproic acid, hydroxy-capric acid, ethyl acetoacetic acid, benzoic acid, phenyl-acetic acid, butylbenzoic acid, ethylbenzoic acid, propylbenzoic acid, hexylbenzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

In combination with the above metal salts of organic acids, or in lieu thereof, a metal salt of a hydrocarbon-substituted phenol can be used. The hydrocarbon substituents contain from four to twenty-four carbon atoms each. The metal can be an alkali metal or alkaline earth metal such as sodium, potassium, lithium, calcium, strontium, magnesium and barium. Among such polyvalent metal phenolates there can be mentioned the magnesium, barium, calcium, strontium, tin and zinc salts of n-butyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The modified metal phenolates disclosed by M. Pollock in U.S. Pat. No. 3,630,979 of Dec. 28, 1971 and by M. Minagawa in U.S. Pat. No. 3,733,288 of May 15, 1973 are also suitable.

Mixture of salts of various metals can be used, such as mixed zinc and tin salts with the alkaline earth metal salts, e.g., barium and zinc stearates, as in U.S. Pat. No. 2,446,976.

The anti-yellowing compositions in accordance with this invention as well as stabilizer compositions comprising these, can be in solid, liquid or paste form. Liquid compositions can be prepared by blending the ingredients and heating at 40° to 200° C. for up to 6 hours to achieve visual homogeneity and storage stability. Inert ingredients that can be added to the anti-yellowing compositions and stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monaryl ethers, and water; anticaking agents such as talc, magnesium trisilicate, sodium silicoaluminate, and aluminum calcium silicate.

Following are the methods used in testing vinyl chloride polymer compositions containing anti-yellowing compositions according to this invention or control compositions used for comparison purposes.

Oven heat stability: Samples of each indicated formulation proportioned to 200 grams of vinyl chloride polymer are compounded on a two-roll mill until well mixed and removed in the form of sheets 1 mm in thickness. Strips cut from each sheet are exposed in an air circulating oven at the indicated temperature, and one strip of each formulation removed every five minutes and attached to a record card. Heat stability is recorded as the time in minutes to the first failure point represented by a deep orange, red, brown or black color.

Initial color and heat color: These properties are rated by means of the Hunter colorimeter and expressed as % yellowness, smaller numbers indicating less yellow samples. Initial color refers to yellowness measured with a sample as removed from the mill. Heat color refers to yellowness measured with a sample heated in an air circulating oven at the indicated temperature for the time shown.

Plate-out: Calender or roll plate-out is caused by an incompatibility of vinyl chloride polymer compound constituents under processing conditions with subsequent deposit on the rolls of the equipment. As the deposit builds up in thickness, it will affect the surface appearance of the vinyl sheeting being produced and it may interfere with heat sealability and printability of the material.

Plate-out is measured through incorporation in the test compound of a red pigment which tends to disperse within the plate-out layer. The red plate-out layer on the mill rolls is then picked up by a clean-up batch. The extent of discoloration of the clean-up batch is a measure of the test compound's tendency to plate-out.

The test procedure is as follows:

There is added to the test compound 2 phr of a 50% pigment dispersion in DOP of Permanent Red 2B pigment. The test compound is charged to the laboratory mill and allowed to run on the mill without disturbing it 3 minutes after the compound is fused and well mixed. The mill temperature is 172°–177° C. After 3 minutes, the red pigmented compound is removed from the mill and discarded. The following clean-up compound is then charged to the mill and run for 3 minutes.

| Resin | 100 parts by weight |
|---|---|
| DOP | 30 |
| TiO₂ | 2 |
| Precipitated silica | 2 |
| Liquid cadmium-barium stabilizer | 2 |
| Stearic acid | 0.5 |

The quantity of clean-up compound is proportioned to 200 parts of resin. The clean-up compound removes from the mill the plate-out and red pigment left from the test compound. The extent of color development of the clean-up compound is a measure of the test compound's plate-out characteristics. A numerical measure of plate-out is provided by comparing the colored clean-up compound with a series of standard compounds to which known amounts of the red pigment are added. The numerical "plate-out value", then, is the concentration of pigment, in mg/kg of resin, that most nearly matches the color of the clean-up compound at the end of the test.

The following examples in the opinion of the inventors represent preferred embodiments of their invention.

EXAMPLE 1

In order to examine the effect of the composition of the present invention, samples of 20×15 mm were cut off from the sheet of 1 mm in thickness prepared by calendering and compression molding in accordance with the following formulation. The heat stability and heat color tests were carried out in a Geer oven at 190° C. Various phosphites, and either dibenzoyl methane (DBM) or a metal derivative of DBM were used. The results are shown in Table-1.

| (FORMULATION) | |
|---|---|
| Polyvinylchloride (Geon 103EP) | 100 parts by weight |
| Dioctylphthalate | 48 |
| Epoxysoybean oil | 2 |
| Zinc Stearate | 0.2 |
| Calcium Stearate | 1.0 |
| Organic Phosphite (Table-1) | 0.5 |
| Dibenzoylmethane (DBM) COMPOUND (TABLE 1) | 0.1 |

The results show the great improvement in the effectiveness of the 1,3-diketone compound accomplished by the joint use of an ortho-substituted phenyl phosphite as part of the composition of this invention together with a diketone compound.

EXAMPLE-2

A sheet was prepared according to the following rigid formulation, and submitted to an oven heat stability test at 190° C., initial color test and heat coloring test after 30 minutes at 190° C. measured by Hunter Colorimeter, and plate-out test.

The results are shown in Table-2. Plate-out is indicated by the quantity of pigment in mg/kg plated out as described above.

| (FORMULATION) | |
|---|---|
| PVC (Geon 103EP 8) | 100 parts by weight |
| Epoxylinseed oil | 1.0 |
| Bis(2,4-di-t-butylphenyl) . cyclohexyl phosphite | 0.5 |
| Mg-stearate | 0.2 |
| Ca-stearate | 1.0 |
| Zn-stearate | 0.4 |
| 1,3-Diketone Compound (Table 2) | 0.08 |

TABLE 1

| No. | ORGANIC PHOSPHITES | 1,3-Diketone Compounds | 190° C. Oven Heat STABILITY Min. | HUNTER % INITIAL COLOR | YELLOWNESS HEAT COLOR 190° C./30 min |
|---|---|---|---|---|---|
| CONTROL | | | | | |
| 1-1 | NONE | NONE | 35 | 40 | 68 |
| 1-2 | NONE | DBM | 35 | 23 | 52 |
| 1-3 | Phenyl . di-2-ethylhexyl phosphite | NONE | 50 | 34 | 50 |
| 1-4 | Phenyl . di-2-ethylhexyl phosphite | DBM | 60 | 21 | 43 |
| 1-5 | NONE | DBM (0.6) | 35 | 18 | 45 |
| 1-6 | Bis(2,4-di-t-butylphenyl) . cyclohexyl phosphite (0.6) | NONE | 60 | 35 | 55 |
| EXAMPLE | | | | | |
| 1-1 | Tris(2,4-di-t-butylphenyl) phosphite | DBM | 85 | 13 | 22 |
| 1-2 | Bis(2,4-di-t-butylphenyl) . cyclohexyl phosphite | DBM | 110 | 9 | 16 |
| 1-3 | Bis(2,4-di-t-butylphenyl) phosphite | DBM-Zn | 100 | 10 | 15 |
| 1-4 | Tridecyl bis(2-cyclohexylphenyl) Phosphite | DBM-Ca | 105 | 15 | 23 |
| 1-5 | Tris(2-t-butyl-4-methylphenyl) phosphite | DBM-Ba | 90 | 13 | 24 |
| 1-6 | 2,4-Di-t-amylphenyl . di-isodecyl-phosphite | DBM | 110 | 11 | 16 |

TABLE 2

| No. | 1,3-Diketone Compounds | 190° C. Oven Heat Stability Min. | HUNTER % YELLOWNESS | | mg/kg PLATE OUT |
|---|---|---|---|---|---|
| | | | INITIAL COLOR | Heat Color 190° C./30 min. | |
| CONTROL | | | | | |
| 2-1 | None | 60 | 42 | 67 | 75 |
| 2-2 | Ca-ethylaceto acetate | 70 | 36 | 62 | 120 |
| 2-3 | Octylaceto acetate | 80 | 25 | 51 | 55 |
| 2-4 | Benzoylacetone (0.58, without phosphite) | 55 | 32 | 60 | 95 |
| EXAMPLE | | | | | |
| 2-1 | Benzoylacetone | 105 | 10 | 13 | 20 |
| 2-2 | Dibenzoylmethane | 115 | 8 | 12 | 15 |
| 2-3 | Dibenzoylmethane-Zn | 110 | 9 | 12 | 20 |
| 2-4 | Stearoyl acetone | 100 | 12 | 16 | 20 |
| 2-5 | Tribenzoylmethane | 95 | 15 | 21 | 25 |
| 2-6 | Dibenzoylmethane-Na | 100 | 13 | 17 | 25 |
| 2-7 | Bis(2-hydroxybenzoyl)-methane | 105 | 15 | 19 | 25 |
| 2-8 | Benzoyl-acetyloctyl-methane | 90 | 12 | 18 | 30 |
| 2-9 | Benzoyltrifluoro-acetone | 100 | 12 | 17 | 20 |
| 2-10 | Bis(p-chlorobenzoyl)methane | 105 | 10 | 20 | 25 |

The results show that this rigid formulation, with phosphite but without a 1,3-diketone compound, is marginally improved by calcium ethylacetoacetate and by octyl acetoacetate, while with benzoylacetone but without phosphite heat stability and plate-out properties are adversely affected. In contrast, the compositions of Examples 2-1 to 2-10 are outstandingly effective. Finding samples according to this invention heated at 190° C. for 30 minutes no more yellowed than unexposed Control samples is dramatic confirmation of the improvement obtained according to this invention.

EXAMPLE-3

To examine the effectiveness of the composition in a stabilized PVC-ABS polymer blend, a sheet was prepared according to the following formulation, and subjected to a heat stability test at 175° C., an initial color test, and a heat coloring test after 60 minutes at 175° C. The results are shown in Table-3.

| (FORMULATION) | |
|---|---|
| Polyvinylchloride | 100 parts by weight |
| Acrylonitryl-butadiene-styrene terpolymer | 10 |
| Epoxysoybean oil | 1.0 |
| Zn toluate | 0.4 |
| Ba nonylphenolate | 0.7 |
| Stearic acid | 0.3 |
| Organic phosphite (Table 3) | 0.5 |
| 1,3-Diketone Compound (Table 3) | 0.05 |

TABLE 3

| No. | ORGANIC PHOSPHITE | 1,3-Diketone COMPOUND | 175° C. OVEN HEAT STABILITY | HUNTER % YELLOWNESS | |
|---|---|---|---|---|---|
| | | | | INITIAL COLOR | HEAT COLOR 175° C./60 min. |
| CONTROL | | | | | |
| 3-1 | None | None | 70 | 35 | 60 |
| 3-2 | None | Dibenzoyl-methane(DBM) | 75 | 21 | 36 |
| 3-3 | Tris(nonyl-phenyl)phosphite | None | 80 | 27 | 53 |
| 3-4 | Tris(nonylphenyl) phosphite | DBM | 85 | 19 | 32 |
| 3-5 | None | DBM(0.55 part) | 55 | 23 | — |
| 3-6 | Bis(2,4-di-t-butylphenyl) . nonylphenyl phosphite (0.55 part) | None | 95 | 25 | 40 |
| EXAMPLE | | | | | |
| 3-1 | Bis(2,4-di-t-butylphenly) . nonylphenyl-phosphite | DBM | 125 | 8 | 13 |
| 3-2 | Bis(2,4-di-t-butylphenyl) . | Bis(p-methoxy-benzoyl)methane | 120 | 10 | 19 |

TABLE 3-continued

| No. | ORGANIC PHOSPHITE | 1,3-Diketone COMPOUND | 175° C. OVEN HEAT STABILITY | HUNTER % YELLOWNESS INITIAL COLOR | HEAT COLOR 175° C./60 min. |
|---|---|---|---|---|---|
| 3-3 | phenylphosphite Bis(2,4-di-t-butylphenyl) . nonylphenoxy poly(n = 10) ethyleneglycol phosphite | DBM | 115 | 12 | 17 |
| 3-4 | Bis(2-t-butyl-phenyl)phosphite | DBM | 110 | 11 | 16 |
| 3-5 | Bis(2,4-di-t-butylphenyl) . butoxyethoxyethyl phosphite | DBM | 120 | 12 | 15 |

The results show the unexpectedly strong interaction of dibenzoylmethane and bis(p-methoxybenzoyl)methane with the ortho-substituted phenyl phosphite in accordance with this invention. This behavior contrasts with the marginal effectiveness of the unsubstituted phosphite alone or with a 1,3-diketone and of the ortho-substituted phosphite without 1,3-diketone, and particularly with the negative effect of increased 1,3-diketone level in the absence of the ortho-substituted phosphite.

EXAMPLE-4

With the composition of this invention there can be incorporated an epoxy compound and improved performance thereby obtained. In this example, tests were carried out in the same way as in Example-1 according to the following formulation.

The results are shown in Table-4.

| (FORMULATION) | |
|---|---|
| PVC (Geon 103EP) | 100 parts by weight |
| DOP | 50 |
| Stearic Acid | 0.3 |
| Zn-toluate | 0.3 |
| Ba-neodecanoate | 0.7 |
| Dibenzoylmethane-Zn | 0.1 |
| 2,4-Di-t-amylphenyl Di-tridecylphosphite | 0.5 |
| Epoxy compound (Table 4) | 1.0 |

TABLE 4

| NO. | EPOXY COMPOUND | 190° C. OVEN HEAT STABILITY Min. | HUNTER % YELLOWNESS INITIAL COLOR |
|---|---|---|---|
| CONTROL | | | |
| 4-1 | None (without DBM-Zn) | 70 | 28 |
| EXAMPLE | | | |
| 4-1 | None | 85 | 15 |
| 4-2 | Epoxidized polybutadiene | 115 | 9 |
| 4-3 | Epoxidized fish oil | 100 | 10 |
| 4-4 | Epoxysoybean oil | 115 | 8 |
| 4-5 | Epoxylinseed oil | 115 | 8 |
| 4-6 | Tris(epoxypropyl) isocyanurate | 115 | 12 |
| 4-7 | Bisphenol A . diglycidyl ether | 120 | 13 |
| 4-8 | Vinylcyclohexene-diepoxide | 100 | 10 |
| 4-9 | Octylepoxystearate | 100 | 8 |

The results of this experiment show the added improvement in both initial color and heat stability obtainable by the use of 1,2-epoxide together with the composition of this invention.

We claim:

1. In an additive composition for improving the color stability upon heating at 175° C. of a vinyl chloride polymer composition stabilized with environmentally acceptable stabilizers only.

said stabilizers comprising at least one salt of a non-nitrogenous mono-carboxylic acid having 6 to 24 carbon atoms or a phenol having 6 to 36 carbon atoms with at least one of the metals lithium, sodium, potassium, zinc, barium, calcium, magnesium, and strontium, and said additive composition comprising a 1,3-diketone represented by the formula

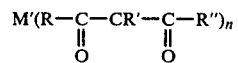

in which R is a hydrocarbon group, a halohydrocarbon group, an alkoxyhydrocarbon group, or an alkylenedioxyhydrocarbon group having 1 to 18 carbon atoms; R' is a hydrogen atom, an acyl group

where R''' is alkyl or a hydrocarbon group having 1 to 18 carbon atoms; R'' is a hydrogen atom or a hydrocarbon group, a halohydrocarbon group, an alkoxyhydrocarbon group, or an alkylenedioxyhydrocarbon group, having 1 to 18 carbon atoms; M' is hydrogen or a metal selected from the group consisting of lithium, sodium, potassium, magnesium, calcium, strontium, barium, and zinc; and n is an integer from 1 to 3 depending on the valence of M'; and an organic phosphite, the improvement in which the organic phosphite has the formula:

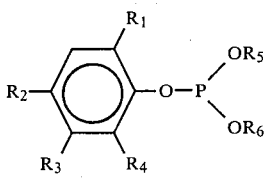

in which $R_1$ is a t-butyl, t-amyl, phenyl or cycloalkyl group having 5 to 8 carbon atoms; each of $R_2$ and $R_3$ independently is a hydrogen atom, a phenyl group, an alkyl group having 1 to 5 carbon atoms, or a cycloalkyl group having 5 to 8 carbon atoms; $R_4$ is a hydrogen atom or a methyl group, and each of $R_5$ and $R_6$ independently is a hydrogen atom, an alkyl group having 1 to 18 carbon atoms, a cycloalkyl group having 5 to 20 carbon atoms, an aryl group having 6 to 12 carbon atoms, an aralkyl group having 7 to 12 carbon atoms, an alkaryl group having 7 to 18 carbon atoms, or an ether-substituted group having 3 to about 80 carbon atoms and 1 to about 40 ether oxygen atoms.

2. A composition according to claim 1 in which $R_5$ is hydrogen.

3. A composition according to claim 1 in which $R_5$ is an alkyl group.

4. A composition according to claim 1 in which $R_5$ and $R_6$ are alkyl groups.

5. A composition according to claim 1 in which $R_5$ is a

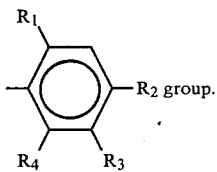

6. A composition according to claim 1 in which $R_5$ and $R_6$ are

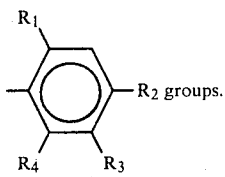

7. A composition according to claim 1 in which in the formula of the 1,3-diketone compound M' is hydrogen.

8. A composition according to claim 1 in which in the formula of the 1,3-diketone compound M' is zinc.

9. A composition according to claim 1 in which in the formula of the 1,3-diketone compound M' is sodium, potassium, or lithium.

10. A composition according to claim 1 in which in the formula of the 1,3-diketone compound R and R'' are alkyl groups.

11. A composition according to claim 1 in which in the formula of the 1,3-diketone compound at least one of R and R'' is an aryl group.

12. A composition according to claim 11 in which the 1,3-diketone compound is dibenzoylmethane.

13. A composition according to claim 1 comprising as an additional ingredient a 1,2-epoxide having 18 to 150 carbon atoms.

14. A composition according to claim 1 in which the amount of the organic phosphite is from 2 to 20 parts by weight per part by weight of the 1,3-diketone compound.

15. A vinyl chloride polymer composition having improved color stability at 175° C. consisting essentially of a vinyl chloride polymer, at least one environmentally acceptable stabilizer, and a color improving additive composition according to claim 1.

16. A vinyl chloride polymer composition according to claim 15 in which per 100 parts by weight of vinyl chloride polymer the amount of the organic phosphite is from 0.05 to 3 parts by weight and the amount of 1,3-diketone compound is from 0.01 to 0.5 parts by weight.

17. A vinyl chloride polymer composition according to claim 15 in which the environmentally acceptable stabilizer is a salt of a non-nitrogeneous monocarboxylic acid having 6 to 24 carbon atoms or a phenol having 6 to 36 carbon atoms with lithium, sodium, potassium, zinc, barium, calcium, magnesium, or strontium.

18. A vinyl chloride polymer composition according to claim 17 in which the stabilizer is a zinc salt.

* * * * *